United States Patent [19]

Sheehan

[11] Patent Number: 4,477,522

[45] Date of Patent: Oct. 16, 1984

[54] REINFORCING ELEMENT AND METHOD OF MAKING THE SAME

[75] Inventor: Richard W. Sheehan, Johnson City, Tenn.

[73] Assignee: Sherwood Research Corporation, Johnson City, Tenn.

[21] Appl. No.: 483,662

[22] Filed: Apr. 11, 1983

[51] Int. Cl.³ .............................................. D02G 3/00
[52] U.S. Cl. ................................ 428/359; 52/309.17;
52/596; 428/362; 428/369; 428/373; 428/379;
428/399
[58] Field of Search ............... 428/359, 360, 362, 373,
428/399, 375, 379, 392, 394, 395, 369; 524/8,
907; 52/596, 600, 309.17

[56] References Cited

U.S. PATENT DOCUMENTS

| | | | |
|---|---|---|---|
| 3,591,395 | 7/1971 | Zonsveld et al. | 106/99 |
| 3,645,961 | 2/1972 | Goldfein | 260/37 N |
| 4,048,371 | 9/1977 | Brumlik | 428/369 X |
| 4,370,390 | 1/1983 | Burk | 428/373 X |
| 4,379,870 | 4/1983 | Matsumoto | 524/8 |

Primary Examiner—Lorraine T. Kendell
Attorney, Agent, or Firm—Luedeka & Neely

[57] ABSTRACT

A reinforcing element for cementitious or plastic material is disclosed which comprises a bundle of a plurality of strands of reinforcing material, the strands in the bundle being generally coextensive and being interconnected in a limited area intermediate their ends to provide brushes of substantially unentangled strands on each side of the intermediate area. There is also disclosed a method of making such elements which includes the steps of preparing a length of yarn comprising a plurality of reinforcing strands interconnected at substantially regular, spaced apart areas, the strands intermediate said interconnected areas being substantially unentangled. The yarn is then cut to produce elements having an interconnected area flanked by lengths of substantially unconnected fibers.

4 Claims, 8 Drawing Figures

REINFORCING ELEMENT AND METHOD OF MAKING THE SAME

The present invention relates generally to reinforcing elements for water hardenable masses; for example, concrete mortar, plaster of paris or the like, as well as for other plastic masses which are hardenable to produce a manufactured product. In addition, the invention relates to a method of making such elements.

In the past, strands of various materials have been incorporated in mortar, concrete, plaster and plastics to improve their strength characteristics and other properties of products manufactured therefrom. One of the earliest uses of this sort of reinforcement was the incorporation of animal hair in plaster so as to improve its integrity. More recently, strands of synthetic plastics, stainless steel and the like have been incorporated in various materials to provide additional strength and other characteristics. One of the problems that is involved in incorporating such strand-like reinforcing materials in a mix is the difficulty of obtaining a relatively uniform dispersion of the strands. Another problem is that the strands, if they become oriented, do not provide uniform characteristics.

In the manufacture of concretes, mortars, and the like, which are reinforced in the described manner, it is extremely difficult to disperse strands in the aqueous mix because of the tendency of the strands to ball together so that, unless extreme care is taken, any undistributed mass of fibers weaken the structure rather than strengthen it. One attempt to eliminate the balling up problem was addressed in U.S. Pat. No. 3,591,395, wherein the inventors suggested the use of fibrillated plastic film in the form of, for example, short pieces of fibrillated binder twine for incorporation in concrete and like products. However, the use of the fibrillated materials would not appear to make use of the maximum reinforcing action for the amount of material employed.

It has been discovered that an extremely efficient reinforcing element may be fabricated by employing a bundle made up of a plurality of strands of reinforcing material, e.g. synthetic plastics, fiberglass or fine metal strands, the strands in the binder being generally coextensive and being interconnected in a limited area intermediate their ends to provide brushes of substantially unentangled strands on each side of the interconnected area. It has been found that these elements may be readily intermixed in concrete, mortar or plaster mixes or in plastics and that in the process of mixing the brush-like sections of each element open out to form a multiplicity of fibers which are oriented in various directions so as to effectively provide reinforcing action. It has been found, in the case of water based materials such as concrete and the like that the reinforcing elements may be incorporated in the mix either prior to the addition of water or after the water has been added with good distribution being effected in either instance.

It has been discovered that reinforcing elements of the type described may be readily manufactured by a method which involves preparing a yarn made up from a plurality of strands of the reinforcing fibers having the strands interconnected together in localized areas at spaced apart points so as to provide alternate interconnected areas and areas in which the strands are not interconnected. Thereafter, the yarn is chopped between the interconnected areas to provide reinforcing elements, as described above.

Various features of the invention are illustrated in the appended drawings in which.

Figure 1:
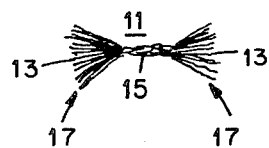
FIG. 1 is a diagrammatic view of a reinforcing element embodying various of the features of the invention.

In the drawings, FIG. 1, there is illustrated a reinforcing element 11 embodying various features of the invention.

As illustrated, the reinforcing element is fabricated from a bundle of a plurality of strands 13 of reinforcing material, the strands 13 in the bundle are generally coextensive and are interconnected in a limited area 15 intermediate the ends of the strands 13. This provides brushes or brush-like sections 17 of substantially unentangled strands 13 which project on each side of the interconnected area 15.

It has been found for most applications that the length of the strands 13 should be between about $\frac{1}{2}$ inch, and 2 inches, and preferably between about $\frac{3}{4}$ to about $1\frac{1}{2}$ inches in length. The length of the interconnected area 15 is preferably a minor portion of the entire length of the reinforcing element 11. The bundle should include from about 15 to 100 strands and in concrete and other water based products, the bundle should comprise between about 25 and 70 strands for best results.

The reinforcing material for the strands 13 can be any suitable material having a high tensile strength, for example, polypropylene, nylon, fiberglass or metal strands, e.g. stainless steel. The cross-sectional area of the strands should be such that the strands have sufficient flexibility to fan out when subjected to agitation when being incorporated into the selected mix.

When polypropylene or nylon strands are employed it has been found that the total denier of the bundle should be between about 500 and 5000 and, preferably, from about 1500 to 3000. In the case of stainless steel the diameter of each strand in the bundle should be approximately 0.004 inches or less. Larger diameter strands of stainless steel do not have the requisite flexibility to spread out to provide optimum reinforcing action. In the event that fiberglass is employed, the fibers should be selected to be comparable to the flexibility of the propropylene fibers sized as above. In the case of fiberglass strands, they interact with cementitious materials and deteriorate, so that for long term usage, they are ordinarily not satisfactory in such mixes.

The strands in each bundle may be interconnected in any suitable fashion such as knotting, entangling, fusing, welding or the like. However, it is preferable that the method of interconnection be such that the overall tensile strength of each strand is not seriously weakened. As will be described hereinafter, the preferred method of interconnecting the strands in each bundle is by employing an air entangling method which causes alternate sections of a yarn made up of the strands to become entangled at spaced apart points while leaving the intervening strands substantially unentangled. The entangled yarn can be chopped up at predetermined intervals to provide the individual reinforcing elements.

Figure 2A:
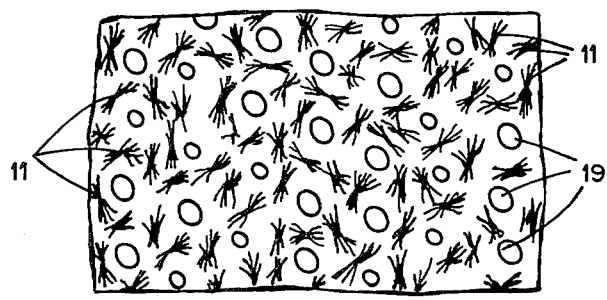
FIG. 2A is a diagrammatic view of a concrete containing reinforcing elements of the type illustrated in FIG. 1.

FIG. 2A shows in diagrammatic form a section of concrete in which there is incorporated a plurality of reinforcing elements 11, as described above. In the drawing, the aggregate is indicated by the reference numerals 19. The distribution of reinforcing elements 11 provides a series of radiating strands from the brushes 17 which extend from each end of the entangled sections 15 to provide three dimensional anchoring sections on each side of the interconnected section 15 which are embedded in the concrete at different angles. Thus, any forces on the concrete are resisted by a plurality of strands which extend at various angles. This provides a highly uniform reinforcing action.

Figure 2B:
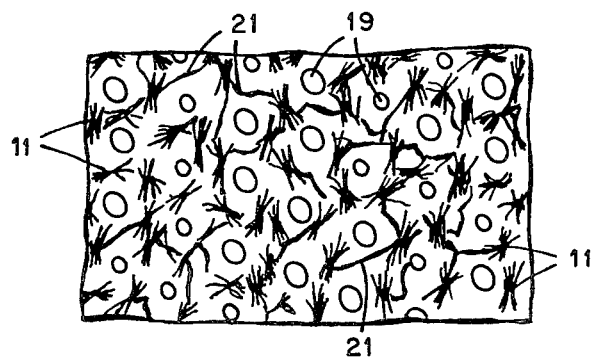
FIG. 2B is a diagrammatic view similar to FIG. 2A showing the manner in which the reinforcing elements interfere with the formation of cracks.

FIG. 2B is a diagrammatic representation similar to FIG. 2A which shows the superficial surface cracks formed in the concrete during curing being represented by reference numeral 21. When such superficial cracks 21 are formed, their progress is prevented or minimized as soon as they extend to a strand. While superficial crack prevention is provided by some of the prior art reinforcing elements involving strands of synthetic fibers or the like, the number of ends which are available to minimize such cracks are less available to prevent the cracking action.

As pointed out above, the reinforcing elements 11 may be made from bundles which are interconnected in various ways. In the following paragraphs there will be described a method and apparatus for producing the elements at high speed and in an economical manner.

Figure 3:
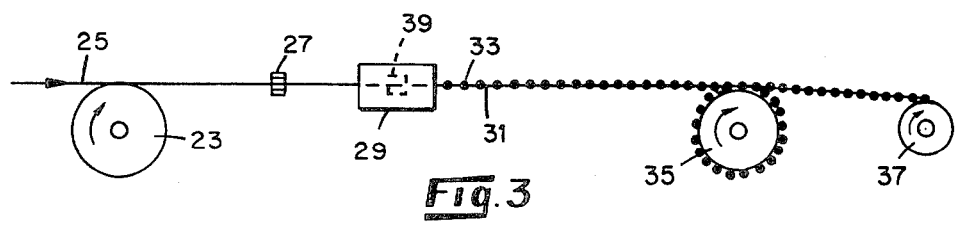
FIG. 3 is a diagrammatic view of one means of forming a yarn with interconnected areas.
Figure 4:
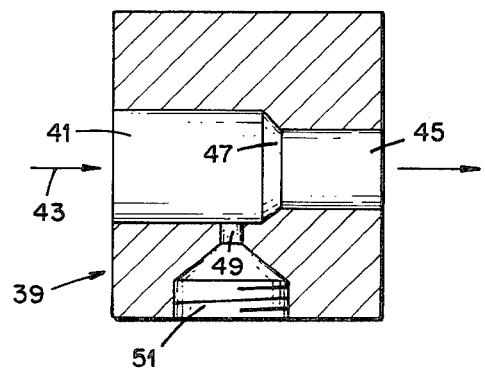
FIG. 4 is a sectional view and an entangling nozzle which forms a part of the apparatus illustrated in FIG. 3.

Referring to FIG. 3, there is illustrated, in diagrammatic form, known apparatus for entangling yarns. The apparatus includes a driven feed roll 23 around which is trained a continuous length of yarn 25 which is made up of a plurality of strands of the reinforcing material used in the reinforcing elements 11. From the feed roll the yarn 25 is passed through a guide 27 and through an entangling box 29 in which the multi-strand yarn 25 is subjected to a jet of pressure air to form alternate sections which are entangled 31 and unentangled 33. The yarn 25 then is trained around a driven take-up roll 35 and is then wound on a take-up reel 37. In the entangling box 29 the yarn is passed through an entangling nozzle 39, which is illustrated in FIG. 4.

The entangling nozzle 39 includes an inlet passageway 41 which is circular in cross-section. The general path of the yarn through the nozzle 39 is shown by the broken line 43. The yarn then passes through an outlet section 45 which is concentric with the inlet section 41 and which is also circular in cross-section. The inlet and outlet sections 41 and 45 are interconnected by a chamfered transition section 47. Air under pressure is injected into the inlet section 41 radially at right angles to the axis of the chamber 41 through a cylindrical passageway 49. The passageway 49 is connected to a source of pressure air (not shown) by means of the threaded fitting 51 below the passageway 49.

Figure 5:
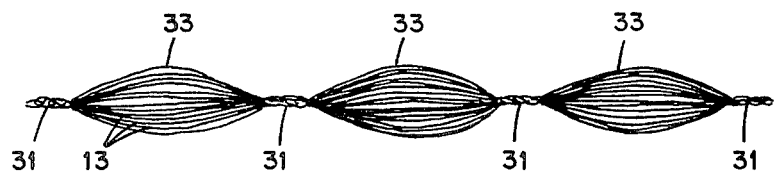
FIG. 5 is a diagrammatic view of a yarn having alternate spaced apart interconnected areas.

As an example of the conditions used to produce an alternately entangled and unentangled yarn of polypropylene, the following conditions are employed. The polypropolene yarn is made up of 42 ends, the yarn having a total denier of 2600. The feed and take-up rolls 23 and 35 are timed to produce movement through the entangling box 29 at approximately 1000 feet per minute. The entangling nozzle 39 includes an inlet section 41 having a diameter of 0.375 inches and a length of 0.825 inches. The outlet section 45 of the entangling nozzle 39 is 0.187 inches in diameter and has a length of 0.25 inches. The transition section 47 is chamfered at an angle of approximately 45°. The air inlet passageway 49 has a diameter of 0.125 inches and is located 0.01 inches from the base of the transition section 47, and an air supply at a pressure of 160 p.s.i.g. is connected to the fitting 51. Under these conditions, when the tension in the area between the take-up roll and feed roll 35 and 23 is maintained at essentially zero with no overfeed or underfeed, the resulting yarn is alternately entangled over an area of about $\frac{1}{4}$ inch, the next $\frac{7}{8}$ inch being substantially unentangled, giving a repeat pattern of approximately $1\frac{1}{8}$ inches. The configuration of the yarn is diagrammatically shown in FIG. 5.

In the entangling process, the strands 13 in the entangled area 31 are caused to interlace with themselves to provide what might be called a knotted area which is tight enough so that the strands do not readily come apart in a mixer under either dry or wet conditions.

Rather than feeding a multifilament yarn into the entangling nozzle 39, the reinforcing material stock, if a synthetic, may be in the form of a ribbon either of oriented or non-oriented film. It has been discovered that the action of the pressure air in the nozzle 39 causes the film ribbon to split into strands which on emerging from the nozzle 39 take the form of yarn illustrated in FIG. 5. Thus, in place of employing the 42 ends of polypropylene there may be substituted a ribbon of polypropylene 0.005 inches thick and 0.45 inches wide which will produce substantially the same results when treated under substantially the same conditions.

Films of from about 0.003 to about 0.005 in thickness and from about 0.25 to about 1.0 inches in width can be substituted for an equivalent total denier of individual strands as the make up reinforcing material for the elements. As pointed out above, the film may be unoriented or longitudinally oriented as the case may be. Of course, the reinforcing material must be susceptible to breaking up in the air stream such as films selected from the class consisting of poylpropylene and nylon.

While certain dimensions have been given for the entangled and unentangled sections of the yarns, a process of the type described, is not precise and there are some variations in both of the lengths of the entangled and unentangled areas and adjustments may be made by varying speed, controlling tension, pressure, etc. by those skilled in the art to produce the variations in lengths of the entangled and unentangled sections and to produce other repeat patterns.

For example, less energy is required to entangle lighter strands and yarns. In entangling a yarn of the total denier of approximately 600 at about 1000 feet per minute, the entangling nozzle is reduced in size so that the inlet chamber is 0.25 inches in diameter, the outlet chamber is 0.125 inches in diameter, the inlet orifice is 0.063 inches in diameter and the air pressure is reduced to about 125 p.s.i.g. This produces an 8 mm repeat pattern. The resulting reinforcing elements are particularly useful in the event that their sections are to be reinforced.

The same equipment with known process variations can be employed to entangle other types of reinforcing strands; e.g. nylon, fiberglass, steel strands, etc.

Because of the nature of the entangled yarn, it is difficult to produce precise cuts to split the unentangled areas 29 in the middle of each unit so as to provide the brush-like sections 17 on a precise basis. I have discovered that with a repeat pattern such as is described above, i.e. average of about ¼ inch of entanglement and an average of about ⅝ inch of relatively unentangled strands, or a repeat pattern of about 1⅛ inches, that excellent results can be obtained by cutting the yarn in lengths which are selected so that the cuts bridge the entangled areas to provide brush areas on each side thereof.

Figure 6:
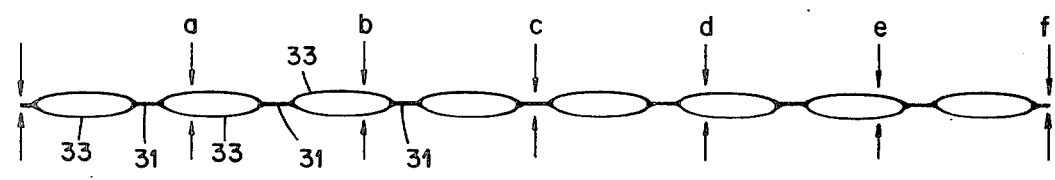
FIG. 6 is a diagrammatic view showing the manner of cutting a yarn of the type shown in FIG. 5 to provide reinforcing elements of the type shown in FIG. 1.
Figure 7:
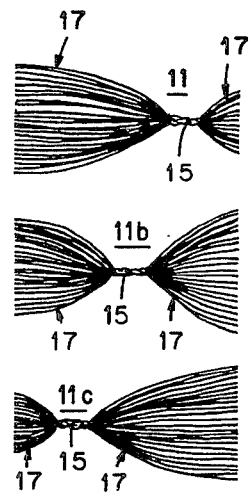
FIG. 7 is a view showing the reinforcing elements which result from the cutting of the yarn illustrated in FIG. 6.

As illustrated in FIG. 6, a yarn with the repeat pattern described and includes eight substantially unentangled sections extending over a distance of approximately 9 inches. As this is cut with a rotary cutter having the cutting blades positioned to cut at 1½ inch intervals or approximately 1½ times the average repeat pattern, the first cut indicated at "a" produces a reinforcing element 11, as shown in FIG. 7. The subsequent cut at "b" produces an element identified as 11b in FIG. 7. The third cut indicated at "c" in FIG. 6 produces reinforcing element as indicated by 11c in FIG. 7. This procedure is repeated with the cut at "d" forming an element 11 of the type shown in FIG. 7; cut "e" forming element 11b, as shown in FIG. 7, and cut "f" forming an element such as shown at 11c in FIG. 7.

When employing air entangling to interconnect the strands it has been found that cuts in the interconnected areas become readily unravelled in handling while the undercut interconnected areas maintain a strong interconnection. Of course, with any high speed cutting operation on an automatic basis, there will be variations resulting from variations in the pattern of entangling as well as variations caused by tension, etc. which will produce some minor proportion of units which include two interconnected areas or which produce fibers which are separated. However, so long as these are of a minor proportion they do not seem to unduly affect the results which are obtained.

Preferably, the cuts should be made from about approximately 1¼ to about 1½ times the repeat pattern. However, satisfactory results can be obtained by cutting in lengths from slightly longer than the repeat pattern to slightly less than twice the repeat pattern.

Reinforcing elements, as described above, may be used in concrete mixes on other materials in amounts sufficient to produce the desired reinforcing action. In one test, three pounds of reinforcing elements, as described above as having a repeat pattern of 1⅛ inches, per cubic yard of concrete were incorporated in the mix of a ready mix truck at the plant. The mix was used to pour sidewalks. Separation of fibers from the mix at the site showed that there was minimal separation of individual strands from the bundles and that the strands were fanned out in the mix. The mix tooled well and tests on the mix showed that the slump was approximately one inch as compared to 6 inches for a mix which did not contain the reinforcing elements. Test cylinders of the mix showed that after 8 days, the compressive strength of the concrete containing the reinforcing elements was 2706 lbs. per square inch while a comparable concrete which did not contain any reinforcing elements had a compressive strength of 2234 lbs./sq/ in. Observation of the sidewalk poured with the reinforcing elements showed a minimum of superficial surface cracks on curing and it was noted that the surface of the sidewalk did not appear to be as slippery as a similar surface which did not include the reinforcing elements.

In the normal gunite process from about 25 to 45 percent of the mix does not adhere to vertical surfaces being covered with cementitious material. The introduction of about 3 pounds of reinforcing elements, as described above, per cubic yard of mix reduces the amount of mix that does not adhere to the wall to approximately 10 to 15 percent. In the gunite process cracks on curing are minimized and the surface has improved impact resistance.

While a preferred embodiment has been shown and described, it will be understood that there is no intent to limit the invention by such disclosure, but rather, it is intended to cover all modifications and alternate constructions falling within the spirit and scope of the invention as defined in the appended claims.

1. A reinforcing element comprising a bundle of from about 15 to about 100 strands of reinforcing material, said strands being between about ⅓ inch and 2 inches in length, and said strands in said bundle being generally co-extensive and being interconnected by entangling said strands with one another in a limited area intermediate their ends to provide brushes of substantially unentangled strands on each side of said intermediate area.

2. The reinforcing element of claim 3 wherein said reinforcing material is selected from the class consisting of strands of polypropylene, nylon, glass fibers, and stainless steel.

3. The reinforcing element of claim 2 wherein said bundle comprises strands of polypropylene fiber, said bundle having a total denier of from about 500–5000.

4. The reinforcing element of claim 2 wherein said bundle comprises from about 25 to about 70 strands of polypropylene fiber, said bundle having a total denier of from about 1500–3000 and having a length of from about ¾ to about 1½ inches.

* * * * *